United States Patent
Simske et al.

(10) Patent No.: US 9,836,750 B2
(45) Date of Patent: Dec. 5, 2017

(54) VALIDATION IN SERIALIZATION FLOW

(71) Applicant: Hewlett-Packard Development Company, L.P., Houston, TX (US)

(72) Inventors: Steven J Simske, Fort Collins, CO (US); Marie Vans, Fort Collins, CO (US); Bradley Alan Loucks, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/784,244

(22) PCT Filed: Apr. 24, 2013

(86) PCT No.: PCT/US2013/037926
§ 371 (c)(1),
(2) Date: Oct. 13, 2015

(87) PCT Pub. No.: WO2014/175873
PCT Pub. Date: Oct. 30, 2014

(65) Prior Publication Data
US 2016/0063510 A1    Mar. 3, 2016

(51) Int. Cl.
*G06F 17/00*    (2006.01)
*G06Q 30/00*    (2012.01)
*G06Q 10/08*    (2012.01)

(52) U.S. Cl.
CPC ....... *G06Q 30/0185* (2013.01); *G06Q 10/087* (2013.01)

(58) Field of Classification Search
CPC ............................. G06Q 10/087; G06Q 10/08
USPC ......................................... 235/375, 383, 385
See application file for complete search history.

(56) References Cited

U.S. PATENT DOCUMENTS

| 6,069,955 | A | 5/2000 | Coppersmith et al. |
| 2006/0219782 | A1 * | 10/2006 | Wong .................... G06Q 10/08 235/385 |
| 2007/0114279 | A1 | 5/2007 | Lessing et al. |
| 2008/0015875 | A1 | 1/2008 | Gardner |

(Continued)

FOREIGN PATENT DOCUMENTS

| JP | 08-007019 A | 1/1996 |
| KR | 1020040007706 A | 1/2004 |

OTHER PUBLICATIONS

Rodgers, D, "Will the Pharma Supply Chain be Able to Use Inference? Maybe Not!", Jun. 7, 2010.

(Continued)

*Primary Examiner* — Daniel St Cyr
(74) *Attorney, Agent, or Firm* — HP Inc. Patent Department (57) ABSTRACT

An example apparatus may include a processor and a memory device including computer program code. The memory device and the computer program code may, with the processor, cause the apparatus to receive serialization codes for a first entity in a serialization flow; compare serialization codes for the first entity to serialization codes for a second entity, the second entity being either upstream or downstream of the first entity in the serialization flow; and validating the serialization codes from the first entity by determining if the serialization codes for the first entity are compatible with the serialization codes for the second entity in the serialization flow.

20 Claims, 4 Drawing Sheets

(56) References Cited

U.S. PATENT DOCUMENTS

| | | | |
|---|---|---|---|
| 2008/0073432 A1* | 3/2008 | Barenburg | G06Q 10/08 235/385 |
| 2009/0026255 A1* | 1/2009 | Besecker | G06Q 20/208 235/375 |
| 2009/0125350 A1 | 5/2009 | Lessing et al. | |
| 2010/0017378 A1 | 1/2010 | Gopalakrishnan | |
| 2012/0013447 A1 | 1/2012 | Simske et al. | |

OTHER PUBLICATIONS

International Search Report and Written Opinion of the International Searching Authority, mailed Jan. 21, 2014, issued in related PCT Application No. PCT/US2013/037926.

* cited by examiner

VALIDATION IN SERIALIZATION FLOW

BACKGROUND

Serialization is used to uniquely identify each of a large set of items. For example, bar codes may be used to identify retail items. Similarly, serial numbers on various products are used to identify each individual product in such a set. Such identifiers may be applied to packaging material or may be applied to objects using labels or medallions, or even impressed or stamped directly on the object.

BRIEF DESCRIPTION OF THE DRAWINGS

For a more complete understanding of various examples, reference is now made to the following descriptions taken in connection with the accompanying drawings in which.

DETAILED DESCRIPTION

In various examples, serialization codes from an entity may be validated. Serialization codes may be incremented at various stages of a serialization flow. The codes received from one entity may be validated by comparing the received codes with codes from an entity that is either upstream or downstream of the entity to be validated. For example, the codes from a packaging entity may be validated by comparing the codes with codes from a manufacturing entity that is upstream of the packaging entity or with codes from a distribution entity that is downstream of the packaging entity. The comparison of the codes may be used to determine whether the codes from the entities are compatible with each other. If the codes are determined to be compatible, the codes may be validated.

In various examples described herein, identifiers may be generated and/or used for mass serialization, such as for unique identification of a product. In various examples, a product may be a physical object, such as a package, a label or a printed document. In other examples, as product may be a virtual object, such as an electronic record, electronic transaction, electronic document or the like. The product may be any of a variety of objects, such as an object for retail sale, a component for a larger assembly, etc. The identifier may be any of a variety of identifiers, such as a bar code, a 2-D bar code such as a quick-response (QR) code, or the like. The identifier may be used to identify various features of the product 10. For example, in the retail arena, the identifier may be used to identify the type of product (e.g., brand, type and size of a box of cereal) to be used at the point of sale. In other examples, the identifier may be used to uniquely identify each item in a set of items such as, for example, a serial number for each component in a set of identical components. As noted above with reference to an object, in various examples, a component may be physical component or a virtual component.

A set of identifiers for mass serialization may use a large number of unique identifiers. For example, a serial number may be assigned to each unit of a product for which a large number of units may be produced. Thus, each unit would be assigned a unique identifier.

A discussion of certain concepts is useful in understanding the various examples described herein. First, it is noted that the number of combinations ($C_{n,p}$) for selecting p items out of n items, where p and n are both non-negative integers and where p≤n, is defined as:

$$C_{n,p} = \binom{n}{p} = \frac{n!}{p!(n-p)!}.$$

where n! is the factorial operator: $n!=n*(n-1)*(n-2)* \ldots * 1$. By definition, $0!=1$.

Serialization may provide a unique identifier to each of a plurality of items. For serialization, the number of serialization combinations is dictated by the base, b, of the character to be printed, raised to the power of N, the number of digits to be printed. For example, if the 26 uppercase and 26 lowercase English characters, along with the 10 numerals are used, then the base is 62, and the number of possible mass serialized values is $62^N$. In other examples, for a binary string, the base is 2. In general, the number of mass serialized values, $n_{MS}$, is given by:

$$n_{MS}=b^N.$$

If the base of the serialization is a power of 2; that is, $b=2^P$, then the number of mass serialized values is:

$$n_{MS}=2^{PN}.$$

Thus, the mass serialization may represents PN bits. If b is not a power of two, then:

$$n_{MS}=2^{N\log_2 b}.$$

Thus, in various examples, the serialization provides $N\log_2 b$ bits of data. For mapping to this serialization, then, the fractional portion of $N\log_2 b$ may be ignored, and the integer portion may represent the number of bits encoded into the N digits using the b-wide character set.

In various examples, the number of bits of data may represent the length of a binary representation of the serialization and may be set to a predetermined length (B). Further, in various examples, the number of 1's in the binary representation may be set within a predefined range. In one example, the length of the binary representation may be set at 40, and the number of 1's in the binary representation may be set between 18 and 22.

In the various examples described below, the number of 1's is set in, or enforced to be, a range defined by a lower number (L) of 1's (e.g., 10) and an upper number (U) of 1's (e.g., 24). Thus, the total number of allowed mass serialization values belonging to the defined range is then given by:

$$n_{MS} = \sum_{p=L}^{p=U} \binom{B}{p}.$$

In various examples, a database of binary strings may be used for a static set of mass serialized numbers with between L and U 1's M the string. The same database may be used for a set of incremental information objects (or IIOs) which may accommodate a stage progression, or a serialization flow. For example, a serialization flow may include stages 1, 2, … X. In this regard, the number of 1's may change within the range delimited by U and L at different stages. In various examples, the number of 1's may jump from less 1s to more 1s as the serialization flow progresses downstream. For example, the serialization of a product may flow from the serialization used at the manufacturing site to the serialization used at the packaging site to the serialization used at the retailing site, etc. This serialization flow may be achieved through various types of IIOs, such as progressive barcodes, for example.

Figure 1:
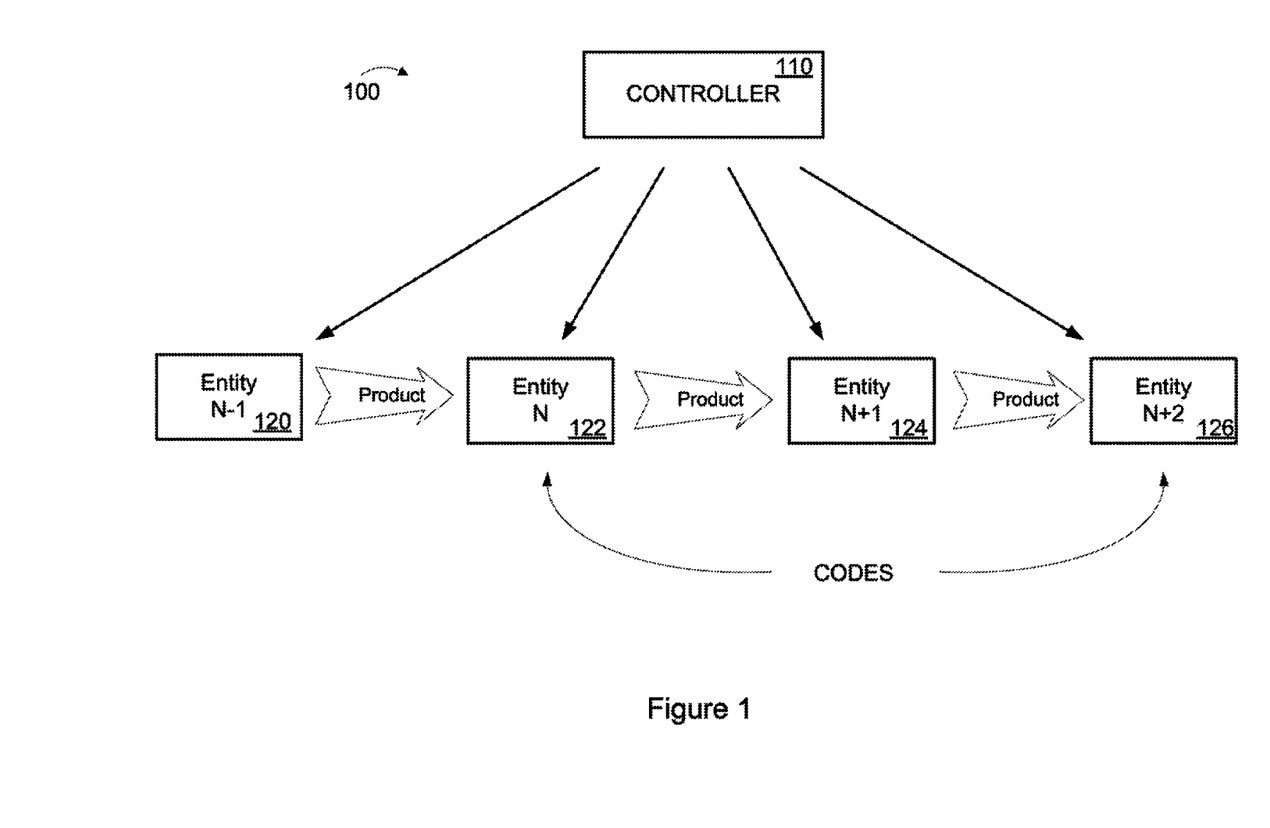
FIG. 1 illustrates an example serialization flow.

Referring now to FIG. 1, a serialization flow in accordance with an example is illustrated. In various examples, the serialization flow 100 may be associated with a product which passes through various entities of the serialization flow 100, such as entities N−1 120, N 122, N+1 124 and N+2 126. The example of FIG. 1 illustrates a product progressing through the various entities 120-126 in the serialization flow. In various examples, the various entities may correspond to, for example, manufacturing, packaging, shipping, etc. Of course, in various examples, the serialization flow may include additional entities. For example, the entity N−1 120 may receive the product from another entity (not shown) that is upstream (to the left in FIG. 1) in the serialization flow 100. Similarly, the entity N+2 126 may pass along the product to another entity (not shown) that is further downstream (to the right in FIG. 1) in the serialization flow 100.

In various examples, one or more entities in the serialization flow 100 may receive a set of serialization codes from a controller 110, as indicated by the arrows from the controller 110 to each entity 120-126 in the serialization flow 100. The controller 110 may be an owner entity or a manager entity which may be responsible for the serialization flow 100, for example. In this regard, the controller 110 may be aware of the serialization codes for each entity in the serialization flow 100. In various examples, the sets of serialization codes may take different forms (or may be represented in different forms) and may be used as identifiers of the products in the serialization flow. Further, while the example of FIG. 1 illustrates arrows representing delivery of the serialization codes from the controller 110 to the entities in the serialization flow 100, at least some of the entities 120-126 may also transmit certain information back to the controller 110.

Figure 2:
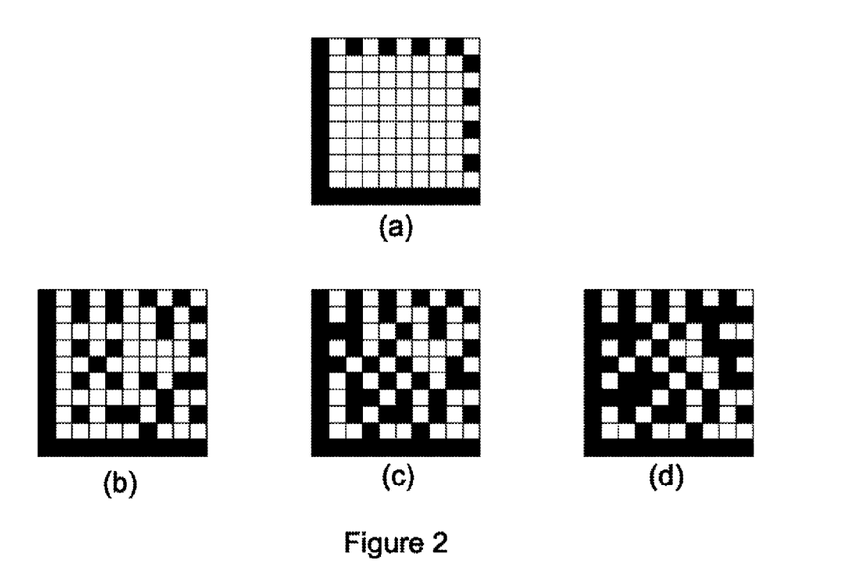
FIG. 2 illustrates an example identifier and an example progression.

Referring now to FIG. 2, an example identifier is illustrated that may be used to represent a serialization code. The example identifier of FIG. 2 is a two-dimensional, machine-readable, bar code having a plurality of regions (e.g., squares) that may be white or black. In other examples, additional colors may also be used. A blank template of the example identifier is illustrated, in 2(a). In this regard, the template includes black squares along two adjacent sides and alternating black and white squares along the two other adjacent sides. This configuration may allow for the correct identification of the orientation of the identifier by a machine reading the identifier, such as a scanner.

Referring now to FIGS. 2(b)-2(d), an example identifier is illustrated at various stages of a serialization flow. For example, FIG. 2(b) illustrates the identifier at a first stage, which in various examples may be a manufacturing stage. In the example of FIG. 1, the identifier at the first stage may be a representation of a code in the set of serialization codes received by a first entity (e.g, entity N 122). The identifier may be modified at a second stage (e.g., packaging stage) by changing, additional white squares to black, as indicated in FIG. 2(c). Again, in the example of Figure the identifier at the second stage may be a representation of a code in the set of serialization codes received by a second entity (e.g., entity N+1 124). The identifier may be similarly modified further at a third stage (e.g., retail stage), as illustrated in FIG. 2(d), which may be a representation of a code in the set of serialization codes received by a third entity (e.g., entity N+2 126).

In various examples, the identifiers and/or the serialization codes may have a representation as a string of characters. For example, the identifiers of FIG. 2 may be represented as a binary string of 0's and 1's. In other examples, the string of characters may include various other types of characters, such as lower case letters, upper case letters, numerals, and/or various other types of characters.

Figure 3:
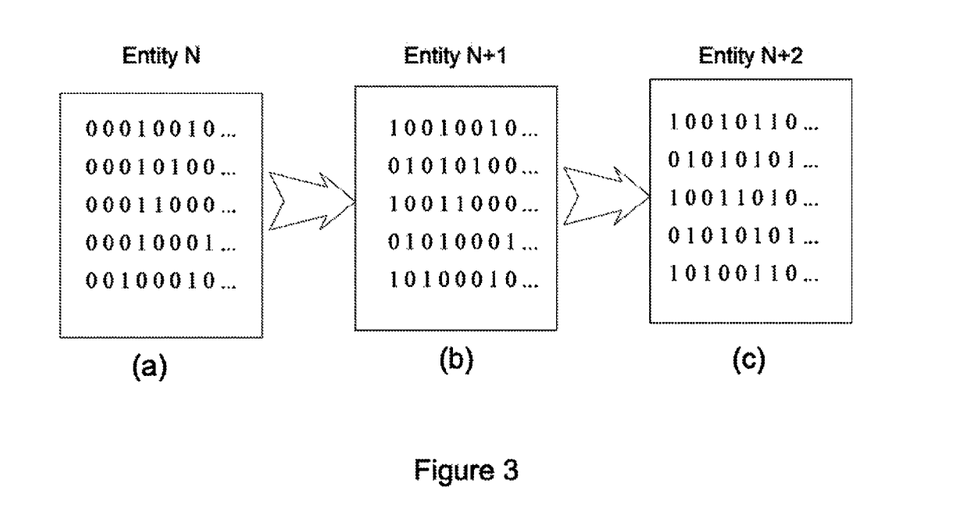
FIG. 3 illustrates an example progression of a binary representation of identifiers.

FIG. 3 illustrates an example identifier represented as a binary string of 0's and 1's. FIG. 3(a) illustrates an example set of identifiers at, for example, a first stage (e.g., at entity N 122). For sake of simplicity, FIG. 3 illustrates a set including only five identifiers, each identifier having a length of a predetermined number of bits, the first 8 of which are shown in the examples of FIG. 3 for each string. Of course, those skilled in the art will appreciate that as set may include any number of identifiers and may have any selected length.

In various examples, each identifier in the set may be formed to have a predefined range of number of characters. For example, in the illustrated example of FIG. 3, the identifiers may have a length of 40 characters and may be formed to have between 10 and 24 1's, and more preferably between 18 and 22 1's. In various examples, at each stage of serialization, each identifier in the set may have a predetermined number, or a predetermined range of numbers, of 1's, with each downstream stage having more 1's than the previous stage. For example, in the illustrated example of FIGS. 1 and 3(a), each identifier in the set for the first entity N 122 may have 10 1's. At another stage in the serialization flow, such as the stage for the second entity N+1 124, each identifier in the set may have a different number or range of numbers of 1's, such as 14 1's. Similarly, at still another stage in the serialization flow, each identifier may have still a different number or range of numbers of 1's, such as 18 1's at the third entity N+2 126.

In various examples, inference forward may be desired using an IIO approach described above with reference to FIGS. 1-3. In this regard, inference refers to associating of related objects in a mass serialized set. In accordance with various examples, inference may be built-in with the mass serialization and serialization flow.

Suppose integers K, J and B are defined by K<J<B, where B is the number of bits in the string and K and J are the number of 1's at progression states N and N+1, which may be various stages in the serialization flow, such as manufacturing, packaging and retail, for example. Thus, generalizing the above example, the identifiers in the serialization may progress from K 1's in the string to J 1's in the string from state N to state N+1. For example, as described above, the number of 1's progresses from 10 at a first stage N to 14 at a second stage N+1 and to 18 at a third stage N+2.

The number of possible states at J given the state at K may therefore be defined as $S(K \rightarrow J)$:

$$S(K \rightarrow J) = \binom{B-K}{B-J} = \frac{(B-K)!}{(B-J)!(J-K)!}$$

Suppose B=8, J=6 and K=4, then $S(K \rightarrow J)$=6. Looking backwards from J to K, however, every state with J 1's may have arisen from the number of states with K 1's defined as $S(K \leftarrow J)$ given by:

$$S(K \leftarrow J) = \binom{J}{K} = \frac{J!}{K!(J-K)!}$$

For the same combination of values, B=8, J=6 and K=4, we have S(K←J)=15. Note that, in general, S(K→J)≠S(K←J), and the ratio is defined by:

$$S(K \leftarrow J)/S(K \rightarrow J) = \frac{\binom{J}{K}}{\binom{B-K}{B-J}} = \prod_{i=K+1}^{J} \left(\frac{B-i+1}{i}\right)$$

This ratio depends on the relative sizes of J, K and B. It can be controlled to set the probabilities of guessing the valid values looking forward S(K→J) and looking backward S(K←J) to the desired low probabilities.

Extending the notation of the example above to include K 1's at state N 122, J 1's at state N+1 124. I 1's at state N+1 126, and B total bits in the binary string, the number of 1's increases at each stage but stays below B (K<J<I<B). Thus, there are six combination computations of interest, three looking forward and three looking backward. The forward-looking equations are:

$$S(K \rightarrow J) = \binom{B-K}{B-J} = \frac{(B-K)!}{(B-J)!(J-K)!}$$

$$S(K \rightarrow J) = \binom{B-K}{B-I} = \frac{(B-K)!}{(B-I)!(I-K)!}$$

$$S(J \rightarrow I) = \binom{B-J}{B-I} = \frac{(B-J)!}{(B-I)!(I-J)!}$$

The three backward-looking equations are:

$$S(K \leftarrow J) = \binom{J}{K} = \frac{J!}{K!(J-K)!}$$

$$S(K \leftarrow I) = \binom{I}{K} = \frac{I!}{K!(I-K)!}$$

$$S(J \leftarrow I) = \binom{I}{J} = \frac{I!}{J!(I-J)!}$$

The ratio of looking back from I to K directly versus looking back from I to J to K in two stages (S(K←I)/S(K←J)*S(J→I)) may be expressed as:

$$\frac{S(K \leftarrow J)}{S(K \leftarrow J)S(J \leftarrow I)} = \left(\frac{I!}{K!(I-K)!}\right)\left(\frac{K!(J-K)!}{J!}\right)\left(\frac{J!(I-J)!}{I!}\right)$$

$$= \frac{(J-K)!(I-J)!}{(I-K)!}$$

Similarly, it can be shown that for forward looking case, the ratio may also be expressed as:

$$\frac{S(K \rightarrow I)}{S(K \rightarrow J)S(J \rightarrow I)} = \frac{(J-K)!(I-J)!}{(I-K)!}$$

In one example, K=10, J=20 and I=30, then this ratio is 10!10!20!=1/184,756. Thus, the two entities at states N 112 and N+2 126 have only a 0.00054% chance of guessing a legitimate value at state N+1.

In one example of an IIO-based inference model, 40 bits for serialization may be used. Thus, there are $2^{40}$=1,099,511,627,776 different 40-bit binary strings. Table 1 illustrates the number of combinations possible for every value of p, where p is the number of 1's in the 40-bit binary string. In one example, an incremental information set having four states may use p=15 (for entity N−1), 18 (for entity N), 22 (for entity N+1) and 25 (for entity N+2). Each of these p-values corresponds to at least 40 billion workflows, meaning if 10 million workflows are eventually supported by this inference set, the odds of guessing a legitimate state at any state of the workflow is less than 1 in 4,000.

TABLE 1

| p | $C_{40,p}$ | Data Set Usage | % Combinations |
|---|---|---|---|
| 0 | 1 | | 0.00% |
| 1 | 40 | | 0.00% |
| 2 | 780 | | 0.00% |
| 3 | 9,880 | | 0.00% |
| 4 | 91,390 | | 0.00% |
| 5 | 658,008 | | 0.00% |
| 6 | 3,838,380 | | 0.00% |
| 7 | 18,643,560 | | 0.00% |
| 8 | 76,904,685 | | 0.01% |
| 9 | 273,438,880 | | 0.02% |
| 10 | 847,660,528 | | 0.08% |
| 11 | 2,311,801,440 | | 0.21% |
| 12 | 5,586,853,480 | | 0.51% |
| 13 | 12,033,222,880 | | 1.09% |
| 14 | 23,206,929,840 | | 2.11% |
| 15 | 40,225,345,056 | Inference Set State N − 1 | 3.66% |
| 16 | 62,852,101,650 | | 5.72% |
| 17 | 88,732,378,800 | | 8.07% |
| 18 | 113,380,261,800 | Inference Set State N | 10.31% |
| 19 | 131,282,408,400 | | 11.94% |
| 20 | 137,846,528,820 | | 12.54% |
| 21 | 131,282,408,400 | | 11.94% |
| 22 | 113,380,261,800 | Inference Set State N + 1 | 10.31% |
| 23 | 88,732,378,800 | | 8.07% |
| 24 | 62,852,101,650 | | 5.72% |
| 25 | 40,225,345,056 | Inference Set State N + 2 | 3.66% |
| 26 | 23,206,929,840 | | 2.11% |
| 27 | 12,033,222,880 | | 1.09% |
| 28 | 5,586,853,480 | | 0.51% |
| 29 | 2,311,801,440 | | 0.21% |
| 30 | 847,660,528 | | 0.08% |
| 31 | 273,438,880 | | 0.02% |
| 32 | 76,904,685 | | 0.01% |
| 33 | 18,643,560 | | 0.00% |
| 34 | 3,838,380 | | 0.00% |
| 35 | 658,008 | | 0.00% |
| 36 | 91,390 | | 0.00% |
| 37 | 9,880 | | 0.00% |
| 38 | 780 | | 0.00% |
| 39 | 40 | | 0.00% |
| 40 | 1 | | 0.00% |
| SUM | 1,099,511,627,776 | | 100.0% |

Thus, for example, in moving from p=15 to p=18, there are 25!22!3!=2300 possible next states. Similarly, in moving from p=18 to p=22, there are 22!18!4!=7315 possible next states. Finally, in moving from p=22 to p=25, there are 18!15!=816 possible next steps.

Referring again to FIG. 1, in various examples, certain entities in the serialization flow may be untrustworthy entities such as entity N+1 124. For example, the product received by entity N+2 126 may be a fraudulent copy of the actual product, rather than the desired product from entity N+1 124. Various examples described herein may detect this break in the trust chain or may validate, or verify the authenticity of, an entity that may be untrusted.

Figure 4:
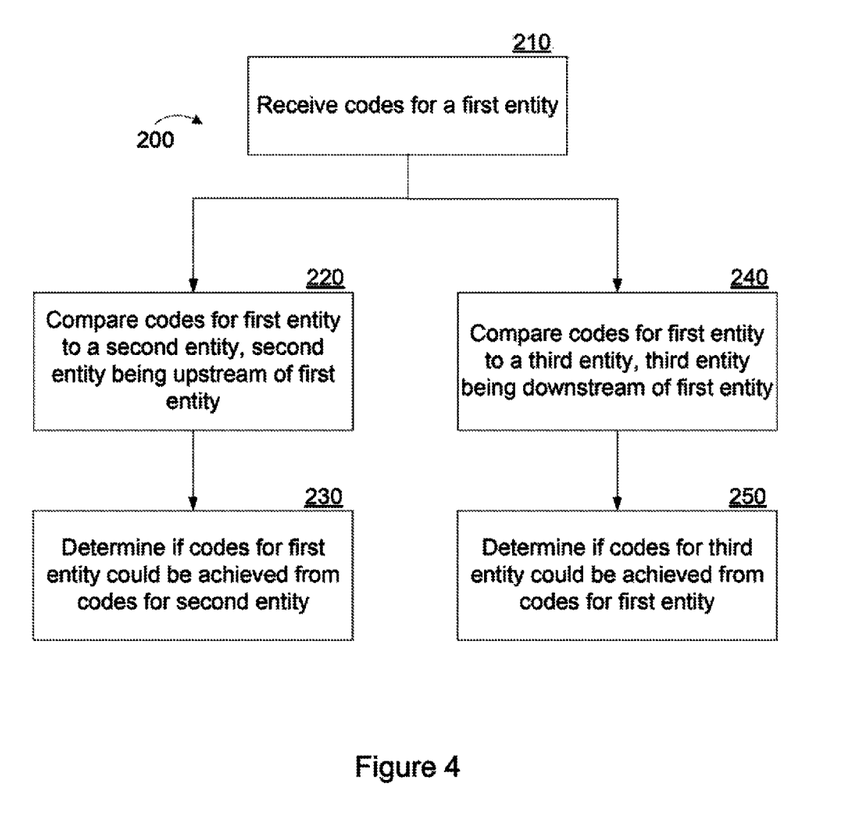
FIG. 4 is a flow chart illustrating an example method.

Referring now to FIG. 4, a flow chart illustrates an example method by which an entity, or serialization codes from an entity, may be validated. In the example process 200 of FIG. 4, serialization codes for a first entity may be received (block 210). The first entity may be an untrusted entity in some examples. In various examples, the serialization codes for the first entity (e.g., entity N+1 124 in FIG. 1) may be received by, for example, another entity that is downstream of the first entity in the serialization flow, such as entity N+2 126 in FIG. 1. In other examples, the serialization codes for the first entity may be received by, for example, a controlling entity, such as the controller 110 of FIG. 1. In various examples, the serialization codes from the first entity may be received as part of a deliver of the product with which the serialization codes are associated.

Upon receipt of the serialization codes from the first entity, the serialization codes from the first entity may be compared with at least one other set of serialization codes. In this regard, each of the other set of serialization codes may correspond to the serialization codes corresponding to an entity at another stage in the serialization flow. In various examples, the entity at another stage may be either upstream or downstream in the serialization flow. FIG. 4 illustrates an example in which the entity at another stage is upstream (left branch) and another example in which the entity at another stage is downstream (right branch) of the first entity in the serialization flow.

In one example, the serialization codes from the first entity are compared with serialization codes from a second entity that is upstream of the first entity (block 220). For example, in the example of FIG. 1, the first entity may be entity N+1 124 (which may be an untrusted entity), and the second entity may be entity N 122, which is upstream of the first entity N+1 124 in the serialization flow 100.

In various examples, the comparison at block 220 may be performed by various entities. In one example, the comparison may be performed by another entity that is downstream of the first entity N+1 124, such as entity N+2 126. In this regard, the two entities N 122 (upstream of the first entity N+1 124) and N+2 126 (downstream of N+1 124) may share their serialization codes with each other (e.g., through sharing of a database). Thus, the downstream entity N+2 126 may access the serialization codes for the upstream entity N 122 and compare them to the serialization codes from the first entity N+1 124 upon receipt of the serialization codes from the first entity N+1 124 as part of the serialization flow.

In another example, the comparison at block 220 may be performed by the controller 110. In this regard, the controller may receive the serialization codes for the first entity (e.g., entity N+1 124) through the downstream entity (e.g., entity N+2 126).

In various examples, the comparison may be used to determine if the serialization codes for the first entity could be achieved from the serialization codes for the second entity which is upstream of the first entity in the serialization flow (block 230). In one example, a Hamming distance between the serialization codes may be determined. For a valid serialization code in the serialization flow, the Hamming distance between the codes is less than or equal to the difference in the number of 1's at the stages being compared. For example, in the example described above, for entity N 122, the number of 1's in the serialization codes may be 18 ($p=18$), and the number of 1's in the serialization codes for entity N+1 may be 22 ($p=22$). Thus, if the Hamming distance between the serialization codes from the first entity (e.g., entity N+1 124) and the serialization codes for the second entity (e.g., entity N 122) is greater than 4 (22–18), then the serialization codes from the first entity may be determined to be invalid or unrelated. For example, the serialization codes from the first entity may be determined to be not part of the same serialization flow as the second entity. On the other hand, if the Hamming distance is less than or equal to 4, the first entity and/or the serialization codes from the first entity may be validated or the authenticity of the first entity or the serialization codes for the first entity may be verified.

In another example, as illustrated by the right branch of FIG. 4, the serialization codes from the first entity may be compared with serialization codes from a third entity that is downstream of the first entity (block 240). For example, in the example of FIG. 1, the first entity may be entity N+1 124 (which may be an untrusted entity), and the third entity may be entity N+2 126, which is downstream of the first entity N+1 124 in the serialization flow 100.

In various examples, as noted above, the comparison at block 240 may be performed by various entities, such as an entity that is downstream of the first entity N+1 124 (e.g., entity N+2 126) or the controller 110. In various examples, the comparison may be used to determine if the serialization codes for the third entity (e.g., entity N+2 126) could be achieved from the serialization codes for the first entity (e.g., entity N+1 124), the third entity being downstream of the first entity in the serialization flow (block 250).

In one example, as noted above, a Hamming distance between the serialization codes may be determined. For a valid serialization code in the serialization flow, the Hamming distance between the codes is less than or equal to the difference in the number of 1's at the stages being compared. For example, in the example described above, for entity N+1 124, the number of 1's in the serialization codes may be 22 ($p=22$), and the number of 1's in the serialization codes for entity N+2 may be 25 ($p=25$). Thus, if the Hamming distance between the serialization codes from the first entity (e.g., entity N+1 124) and the serialization codes for the third entity (e.g., entity N+2 126) is greater than 3 (25–22), then the serialization codes from the first entity may be determined to be invalid or unrelated.

In some examples, the serialization codes for the first entity may be compared with both serialization codes for an upstream entity and serialization codes for a downstream entity. Thus, in the example of FIG. 4, both the left branch and the right branch may be performed.

Figure 5:
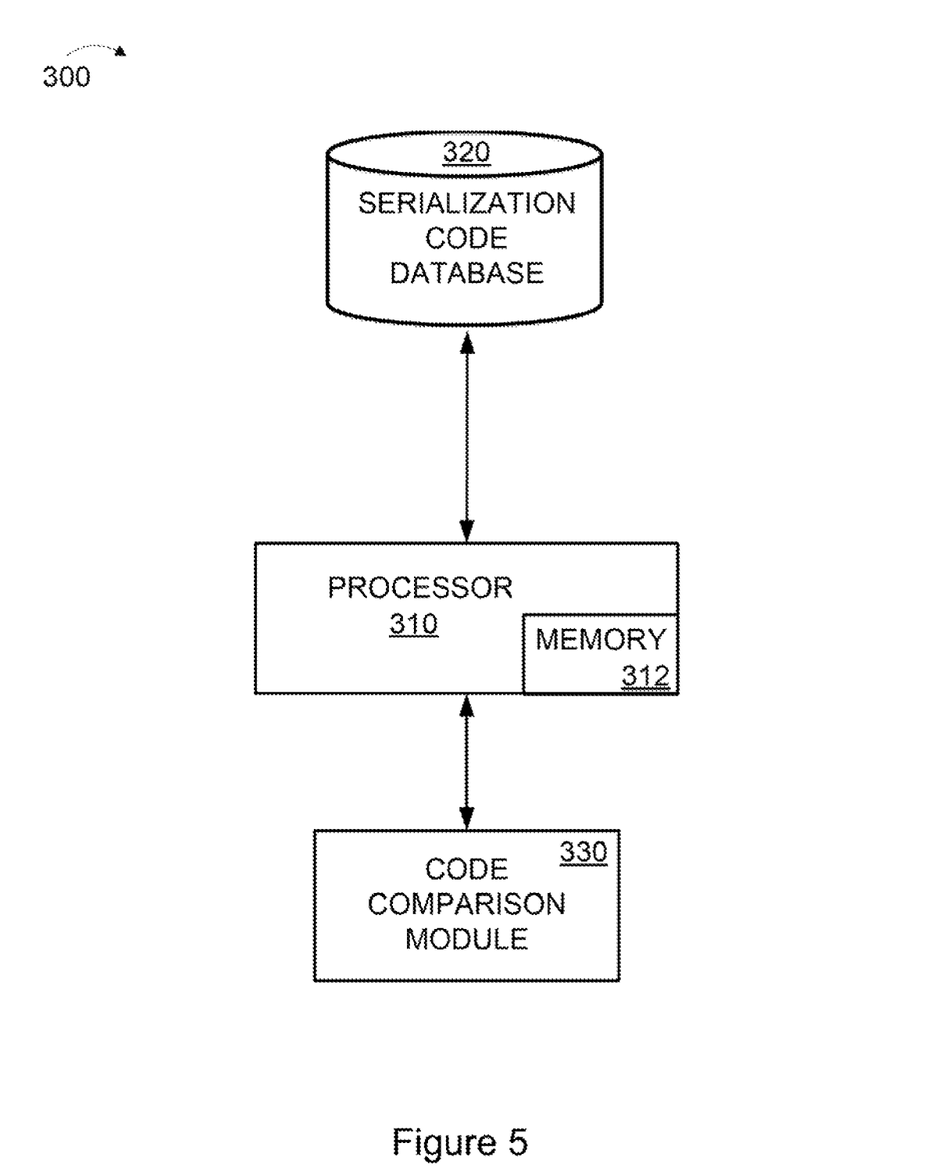
FIG. 5 illustrates an example system.

Referring now to FIG. 5, an example system is illustrated. The system 300 may be implemented at one or more of the entities in the serialization flow 100, for example, or at the controller 110. The system 300 includes a processor 310 which may have a non-transitory memory device 312. In various examples, the memory device may be integrally formed with the processor or may be an external memory device. The memory device 312 may include program code that may be executed by the processor. For example, one or more processes may be performed to execute the example method described above with reference to FIG. 4.

The example system 300 may further include a serialization code database 320 which may store serialization codes for one or more entities in the serialization flow, for example. In various examples, the serialization database 320 may include the serialization codes for at least the entity at which the system 300 is implemented. Additional sets of serialization codes may be provided as desired.

The example processor 310 of the system 300 may be in communication with a code comparison module 330. In various examples, the code comparison module 330 may compare different sets of serialization codes and provide the results of the comparison to the processor 310. In one example, the code comparison module 330 may determine a Hamming distance, or a maximum Hamming distance, between the sets of the serialization codes.

Thus, in various examples, serialization codes from an entity that may be untrusted may be validated and/or the authenticity of the entity may be verified.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An apparatus, comprising:
   a processor; and
   a memory device including computer program code, the memory device and the computer program code, with the processor, for causing the apparatus to perform at least the following:
   receive serialization codes for a first entity in a serialization flow;
   compare serialization codes for the first entity to serialization codes for a second entity, the second entity being either upstream or downstream of the first entity in the serialization flow; and
   validating the serialization codes from the first entity by determining if the serialization codes for the first entity are compatible with the serialization codes for the second entity in the serialization flow,
   wherein serialization codes are represented as binary strings of 0's and 1's,
   wherein a number of 1's in the binary strings increases as the serialization flow proceeds downstream; and
   wherein the serialization codes for the first entity are not compatible with the serialization codes for the second entity at least when a hamming distance with serialization codes is greater than a difference in the number of 1's in the binary strings.

2. The apparatus of claim 1, wherein the second entity is upstream of the first entity in the serialization flow, and
   wherein the serialization codes for the first entity are compatible with the serialization codes for the second entity when the serialization codes for the first entity can be achieved from the serialization codes for the second entity.

3. The apparatus of claim 1, wherein the second entity is downstream of the first entity in the serialization flow, and
   wherein the serialization codes for the first entity are compatible with the serialization codes for the second entity when the serialization codes for the second entity can achieved from the serialization codes for the first entity.

4. The apparatus of claim 1, wherein receiving serialization codes comprises receiving serialization codes associated with physical objects.

5. The apparatus of claim 1, wherein receiving serialization codes comprises receiving serialization codes associated with incremental information objects.

6. The apparatus of claim 1, wherein the memory device further causes the apparatus to perform: identifying the set of serialization codes from the first entity as associated with a fraudulent copy if the serialization codes are not determined to be valid.

7. A method, comprising:
   receiving a first set of serialization codes from a first entity in a serialization flow;
   receiving a second set of serialization codes from a second entity in the serialization flow;
   comparing the first set of serialization codes with the second set of serialization codes; and
   validating the first set of serialization codes by determining compatibility of the first set of codes with the second set of serialization codes in the serialization flow,
   wherein the second entity is upstream of the first entity in the serialization flow, and
   wherein the serialization codes for the first entity are compatible with the serialization codes for the second entity when the serialization codes for the first entity could be achieved from the serialization codes for the second entity.

8. The method of claim 7, wherein serialization codes are represented as binary strings of 0's and 1's.

9. The method of claim 8, wherein a number of 1's in the binary strings increases as the serialization flow proceeds downstream.

10. The method of claim 9, wherein the serialization codes for the first entity are not compatible with the serialization codes for the second entity at least when a hamming distance with serialization codes is greater than a difference in the number of 1's in the binary strings.

11. The method of claim 7, wherein the second entity is downstream of the first entity in the serialization flow, and wherein the serialization codes for the first entity are compatible with the serialization codes for the second entity when the serialization codes for the second entity can achieved from the serialization codes for the first entity.

12. The method of claim 7, wherein receiving the first set of serialization codes comprises receiving serialization codes associated with physical objects.

13. The method of claim 7, wherein receiving the first set of serialization codes comprises receiving serialization codes as part of a product delivery.

14. The method of claim 7, wherein receiving the first set of serialization codes comprises receiving serialization codes associated with incremental information objects.

15. The method of claim 7, further comprising identifying the first set of codes as being associated with a fraudulent copy.

16. A computer program product, embodied on a non-transitory computer-readable medium, comprising:
   computer code for receiving a first set of serialization codes from a first untrusted entity in a serialization flow;
   computer code for accessing a second set of serialization codes from a second trusted entity in the serialization flow;
   computer code for comparing the first set of serialization codes with the second set of serialization codes; and
   computer code for validating the first set of codes from the first entity by determining compatibility of the first set of codes with the second set of serialization codes in the serialization flow
   wherein the second entity is downstream of the first entity in the serialization flow, and
   wherein the serialization codes for the first entity are compatible with the serialization codes for the second entity when the serialization codes for the second entity could be achieved from the serialization codes for the first entity.

17. The computer program product of claim 16, wherein the trusted entity is upstream of the untrusted entity in the serialization flow, and
   wherein the serialization codes for the first entity are compatible with the serialization codes for the second entity when the serialization codes for the first entity can achieved from the serialization codes for the second entity.

18. The computer program product of claim 16, wherein computer code for receiving a first set of serialization codes comprises computer code for receiving a first set of serialization codes from a set of physical objects.

19. The computer program product of claim 16, computer code for receiving a first set of serialization codes comprises computer code for receiving a first set of serialization codes from a set of incremental information objects.

20. The computer program product of claim 16, further comprising computer code for identifying the first set of serialization codes as being associated with a fraudulent copy.

* * * * *

UNITED STATES PATENT AND TRADEMARK OFFICE
CERTIFICATE OF CORRECTION

Page 1 of 1

PATENT NO.         : 9,836,750 B2
APPLICATION NO.    : 14/784244
DATED              : December 5, 2017
INVENTOR(S)        : Steven J Simske et al.

It is certified that error appears in the above-identified patent and that said Letters Patent is hereby corrected as shown below:

In the Claims

In Column 11, Line 30, in Claim 16, delete "flow" and insert -- flow, --, therefor.

Signed and Sealed this
Tenth Day of April, 2018

Andrei Iancu
*Director of the United States Patent and Trademark Office*